US005753994A

United States Patent [19]

Drexlmaier

[11] Patent Number: 5,753,994

[45] Date of Patent: May 19, 1998

[54] PLASTIC HAMMER-TYPE BRUSH HOLDER

[75] Inventor: Thomas Drexlmaier, Wuerzburg, Germany

[73] Assignee: Siemens Aktiengesellschaft, Munich, Germany

[21] Appl. No.: 803,369

[22] Filed: Feb. 20, 1997

[30] Foreign Application Priority Data

Feb. 26, 1996 [DE] Germany ........................ 196 07 196.8

[51] Int. Cl.$^6$ .............................. H02U 5/16; H02U 13/00

[52] U.S. Cl. ............................ 310/239; 310/90; 310/242

[58] Field of Search ............................ 310/239, 90, 241, 310/242

[56] References Cited

U.S. PATENT DOCUMENTS 1,392,996 10/1921 Willey .................................... 310/239
2,356,105 8/1944 Uhler ..................................... 310/239

FOREIGN PATENT DOCUMENTS 0684670 11/1995 European Pat. Off. .
1246103 8/1967 Germany .
2814009 10/1979 Germany .
3165439 10/1994 Germany .
36552 3/1906 Switzerland .

*Primary Examiner*—Steven L. Stephan
*Assistant Examiner*—Michael J. Wallace, Jr.
*Attorney, Agent, or Firm*—Sughrue, Mion, Zinn, Macpeak & Seas, PLLC

[57] ABSTRACT

In order to ensure a secure fit and a constant setting angle for a brush (4) plugged into a box-shaped brush receptacle (1) of a brush holder even in the event of relatively severe thermal and/or bending stress, a thin-walled connecting web (3) connecting a pivoted bearing arrangement (2) to the brush receptacle (1) is furcated at least at the receptacle end of the web (3). The resulting forks (3.1; 3.2) lead into the longitudinal sidewalls (1.1; 1.2) of the box-shaped brush receptacle (1), which are parallel to the connecting web (3).

20 Claims, 3 Drawing Sheets

PLASTIC HAMMER-TYPE BRUSH HOLDER

FIELD OF AND BACKGROUND OF THE INVENTION

The invention relates to holders made of synthetic material for securing conducting brushes. More particularly, the invention relates to plastic holders for hammer-type brushes, such as those used in commutator motors and other electric machines.

EP 0 684 670 (A2) and DE 28 14 009 (C3) disclose plastic hammer-type brush holders fashioned as pivoted arms for use in electric machines such as commutator motors. The known plastic hammer-type brush holder is designed to be pivotally mounted at one end of its pivoted arm arrangement by means of an integrally formed pivoted bearing that is formed as a knife-edge on the motor stator side thereof. At the other end of its pivoted arm arrangement, the holder has a brush receptacle for receiving a carbon brush. Once plugged into place in the receptacle, the carbon brush can be pressed against the segment surface of a commutator. According to the conventional design, the box-shaped brush receptacle at the one end of the pivoted arm arrangement is connected to the pivoted bearing at the other end of the pivoted arm by a middle web. This connecting web leads, on the brush side of the holder, into one of the transverse sidewalls of the box-shaped brush receptacle, in such a manner that the connecting web runs perpendicularly into the transverse sidewall.

OBJECTS OF THE INVENTION

It has been recognized that, in the event of severe thermal and/or pressure stresses, the torque forces acting on the connecting web lead to a deformation of the transverse sidewall of the box-shaped brush receptacle, given that the sidewall and the connecting web are fastened together. As a result, the reliability with which the carbon brush is held and the constancy of its setting angle relative to the segment surface of the commutator or slipping surface may be adversely affected.

It is therefore a first object of the invention to provide a synthetic brush holder that, even in the event of relatively large pressure stresses and/or thermal stresses, ensures a constant setting angle of the brush relative to the wiped commutator segment surface or slipring surface contacted by the brush. It is a further object to create a plastic brush holder that is easy to produce and lightweight.

SUMMARY OF THE INVENTION

These and other objects are achieved by the teachings of independent claims 1 and 17. Particularly advantageous refinements of the invention are the subject matter of the dependent claims. The invention provides a plastic hammer-type brush holder, formed as a pivoted arm, for an electric machine. The brush holder includes a box-shaped brush receptacle provided on one end of the pivoted arm and having longitudinal sidewalls. The brush holder also includes at least one pivoted bearing arrangement provided on the other end of the pivoted arm. A thin-walled connecting web connects the pivoted bearing arrangement and the box-shaped brush receptacle. The connecting web extends substantially parallel to the longitudinal walls and is furcated into forks that lead, respectively, into the longitudinal sidewalls of the box-shaped brush receptacle.

In the plastic hammer-type brush holder according to the invention, the forces acting on the connecting web are kept away from the transverse sidewalls of the box-shaped brush receptacle, which are sensitive to deformation. Instead, these forces are redirected and introduced into the longitudinal sidewalls of the box-shaped brush receptacle. Since the longitudinal sidewalls extend generally in the same direction as the connecting web, the forces are directed lengthwise into the longitudinal sidewalls. This causes the box-shaped brush receptacle overall to be much less prone to deformation. As a result, plastic hammer-type brush holders according to the invention exhibit high strength and great resistance to deformation, thereby ensuring a constant setting angle for the brushes secured therein. Moreover, according to the inventive design, it is not necessary to increase the density or thickness of the sidewalls or connecting web to achieve these advantages. Even when the brush holder is manufactured to be lightweight and to have a small mass inertia, it nonetheless exhibits high strength and is capable of firmly securing the brush, providing additional advantages over the conventional design.

According to a further aspect of the invention, the connecting web can be similarly furcated at the pivoted bearing end of the arrangement. If this is done, it becomes possible to dispense with a solid continuous knife-edge for the pivoted bearing and, instead, to provide two individual pivoted bearings of smaller mass and spaced apart from each other at the ends of the forked connecting web. The forces acting on the connecting web are introduced into each individual pivoted bearing, which, because of their spacing, simultaneously improves the stability to tilting of the hammer-type brush holder's steady bearing, located on the stator side.

BRIEF DESCRIPTION OF THE DRAWINGS

The invention and further advantageous refinements of the invention according to the features of the dependent claims are explained in more detail below with the aid of diagrammatic exemplary embodiments in the drawing, in which:

DETAILED DESCRIPTION OF THE PREFERRED EMBODIMENTS

Figure 11:
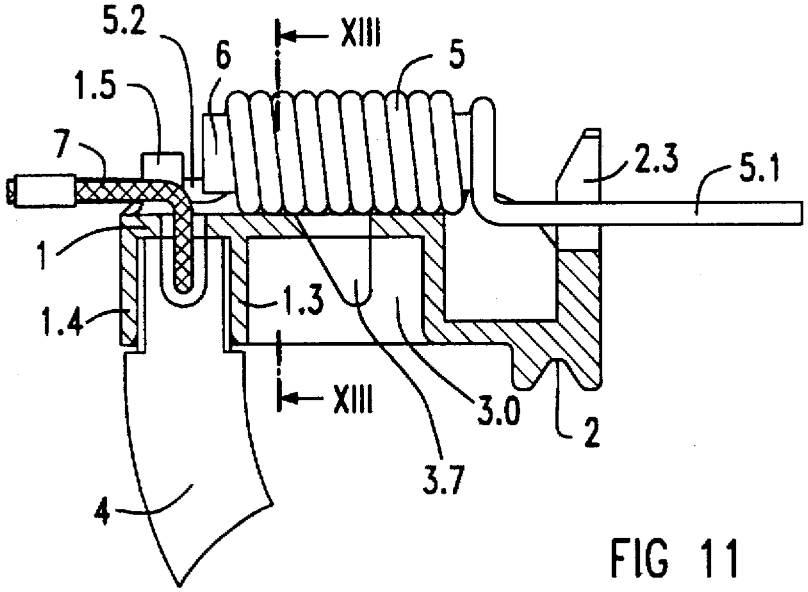
FIGS. 11–13 show a conventional plastic hammer-type brush holder, which provides a point of departure for the present invention.

FIG. 11 shows a hammer-type brush holder which is assembly-ready and equipped with all its components. It takes the form of an integrated plastic injection-molded part operating as a pivoted arm when mounted. One end of the arm is provided with a box-shaped brush receptacle 1, while a continuous knife-edge pivoted bearing arrangement 2 forms the other end of the pivoted arm. A middle connecting rod 3.0 connects the box-shaped brush receptacle 1 to the pivoted bearing arrangement 2. The brush holder is additionally provided with an interference-suppression inductor 5, 6, which is affixed onto the top side of the plastic injection-molded part. A brush 4 is plugged into the box-shaped brush receptacle 1 on the underside of the plastic injection-molded part.

Figure 12:
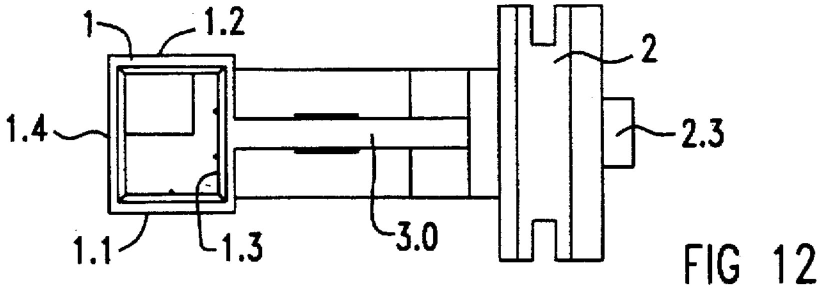

FIG. 12 shows the underside of an as yet unequipped plastic injection-molded part of the hammer-type brush holder shown in FIG. 11.

Figure 13:
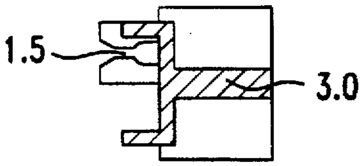

FIG. 13 shows a sectional view through the plastic injection-molded part, likewise as yet unequipped, of the hammer-type brush holder along the line of section XIII—XIII in FIG. 11.

As seen, in particular, from FIG. 12, the pivoted bearing 2 is constructed as a solid, continuous knife-edge bearing. The box-shaped brush receptacle 1, on the other hand, has two opposing transverse sidewalls 1.3, 1.4 and two opposing longitudinal sidewalls 1.1, 1.2, whereby all the walls together form a box for receiving a brush 4. The brush 4, which has an external power lead 7 contacted thereto at its upper plug-in end, is plugged in a press-fitted fashion into the downwardly open box-shaped brush receptacle 1. The connecting rod 3.0 extends centrally down the length of the pivoted arm between the pivoted bearing 2 and the box-shaped receptacle 1. The rod 3.0 is constructed to intersect the center of this knife-edge bearing at the pivoted-bearing end. At the brush receptacle end as well, the rod 3.0 intersects the proximal transverse sidewall 1.3 perpendicularly and at its center.

As described above, the inductor coil 5 of the interference-suppression conductor 5, 6 is wound around an iron core 6 and is fixed in a straightforward manner to the back of the hammer-type brush holder. In particular, as illustrated in FIG. 13, upon assembly, the coil 5 is plugged with its terminal ends 5.1, 5.2 into respective clamping holders 1.5, 2.3, and rests in a trough-shaped receptacle on the back of the brush holder. The holders 1.5, 2.3 can be formed through injection molding onto the plastic injection-molded part. Overall, this arrangement for securing the interference-suppression conductor is mechanically effective, as well as being both simple and cost-efficient in terms of production. However, as explained above, the structural design of the connecting rod 3.0 is not entirely satisfactory.

Figure 1:
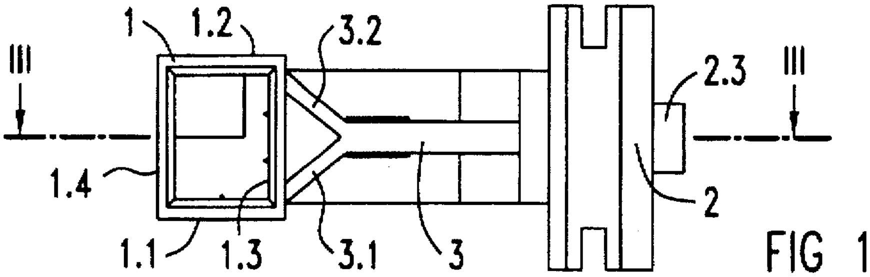
FIGS. 1–5 show a first embodiment of a plastic hammer-type brush holder, according to the invention, in various views, including sectional views.
Figure 2:
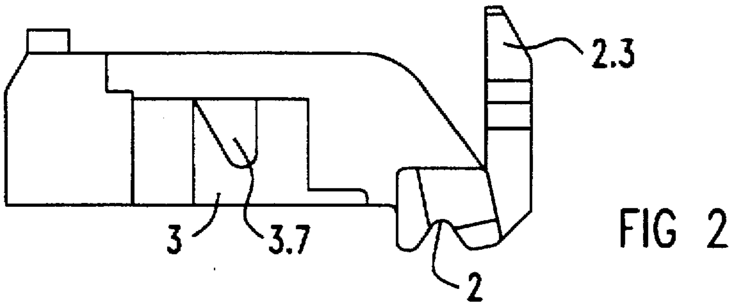
Figure 3:
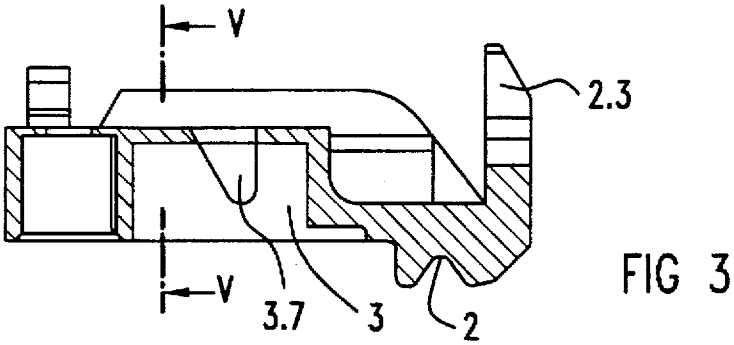
Figure 4:
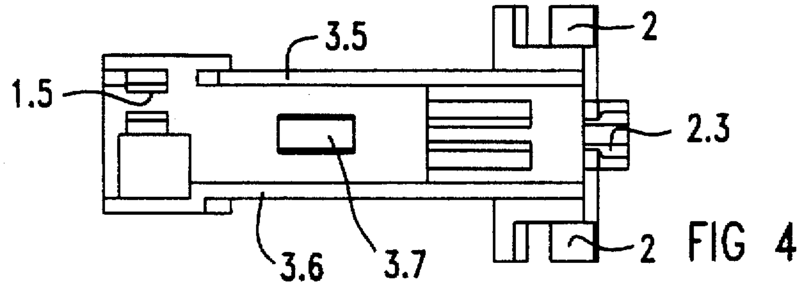
Figure 5:
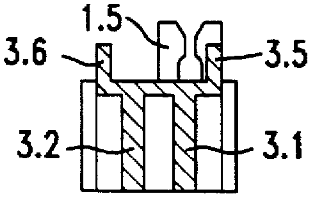
Figure 6:
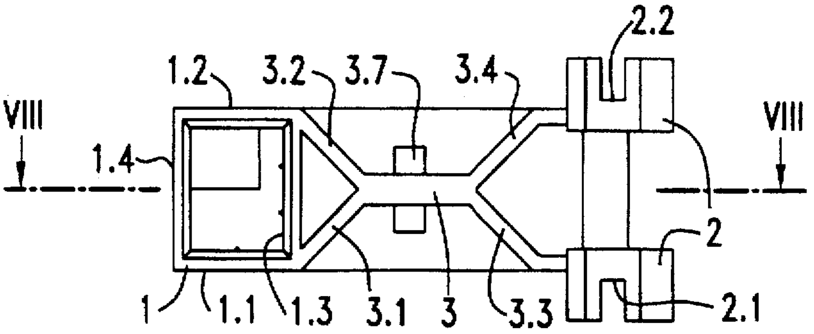
FIGS. 6–10 show a second embodiment of a plastic hammer-type brush holder according to the invention, in various views, including sectional views.
Figure 7:
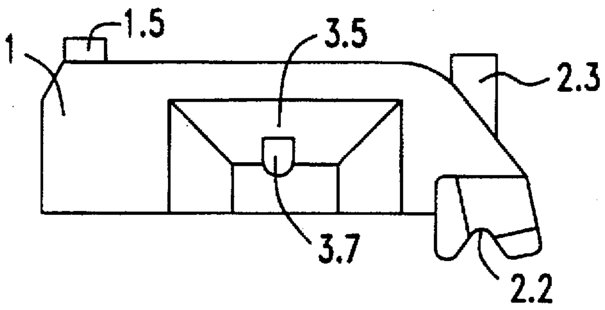
Figure 8:
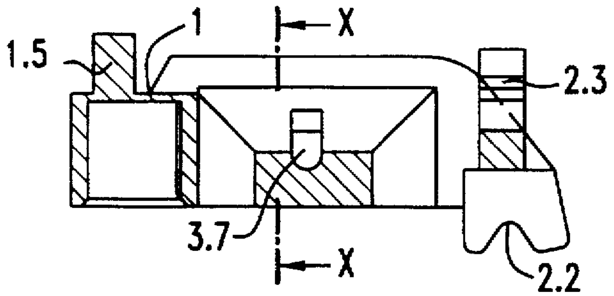
Figure 9:
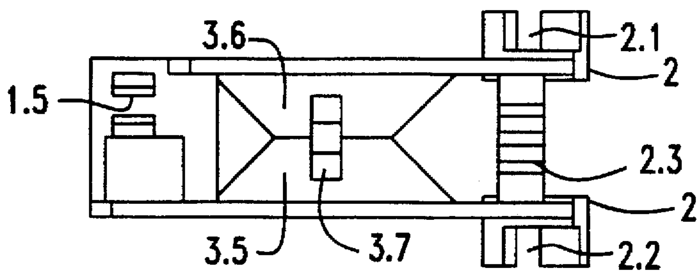

FIGS. 1–5 show a first embodiment of a plastic hammer-type brush holder according to the invention. The brush and interference-suppression inductor components are omitted from these FIGS. 1–5 for the sake of a clearer representation. FIG. 1 shows a bottom view of the pivoted arm consisting of an integral plastic injection-molded part. It includes, generally, a box-shaped brush receptacle 1 on one end of the pivoted arm and a pivoted arm bearing 2 on the other end of the pivoted arm. A connecting web 3 connects the brush receptacle 1 to the pivoted bearing 2. A side view of the plastic injection-molded part is shown in FIG. 2, while the section along line III—III in FIG. 1 is shown in FIG. 3. A rear plan view is shown in FIG. 4, and a section taken along line V—V of FIG. 3 is shown in FIG. 5.

According to the invention, the connecting web 3 is constructed as a thin-walled middle web having one end bifurcated into forks 3.1, 3.2. Instead of leading into the proximate transverse sidewall 1.3, as in the conventional design of FIGS. 11–13, these brush-side forks 3.1, 3.2 lead into the two longitudinal sidewalls 1.1 and 1.2, respectively, of the box-shaped brush receptacle 1. These longitudinal sidewalls 1.1 and 1.2 extend essentially parallel to at least the central portion of the connecting web 3. As a result, the transverse sidewall 1.3 of the box-shaped brush receptacle 1 is advantageously kept free of deformations caused by mechanical and thermal stresses imparted from the connecting web 3. A brush plugged into the box-shaped brush receptacle 1 is therefore held securely under all operational conditions and at a constant setting angle relative to the segment surface of a commutator or of a slipring wiped by the brush.

A further embodiment of the invention is shown in FIGS. 6–10 and represented in the same sequence of figures as the FIG. 1–5 sequence. According to the second embodiment, the connecting web 3 also spreads at its other end with forks 3.3, 3.4 leading into two individual pivoted bearings 2.1, 2.2. The bearings 2.1 and 2.2, rather than being a single unitary structure, are arranged at a lateral spacing relative to one another. By introducing stresses from the connecting web 3 via the forks 3.3 and 3.4 into the lateral individual pivoted bearings 2.1 and 2.2, respectively, it becomes possible to dispense with the continuous, solid knife-edge bearing arrangement. As already described with respect to FIGS. 11–13, the solid, continuous arrangement is necessary whenever the connecting web 3.0 leads into the middle region of the pivoted bearing 2 and the forces must be absorbed as transverse forces by the pivoted bearing arrangement. Reducing the pivoted bearing arrangement to two lateral, mutually spaced individual pivoted bearings 2.1 and 2.2 makes it possible not only, advantageously, to reduce the mass inertia of the entire plastic injection-molded part, but also to improve the stability to tilting of the hammer-type brush holder in its stator-side steady bearing.

Figure 10:
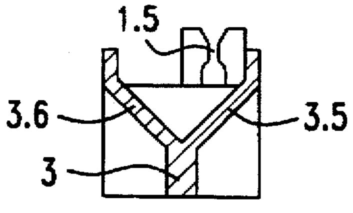

According to yet another refinement of the invention, as illustrated, e.g., in FIG. 5 and FIG. 10, the connecting web 3 widens on the top side of the brush holder to form a trough having trough sidewall parts 3.5 and 3.6, thereby providing a plug-in receptacle for the interference-suppression inductor 5, 6. In addition, owing to the depth of the V-shaped structure of the forks 3.1, 3.2 and 3.3, 3.4, respectively, as shown in FIG. 10, it is possible to reduce the overall height of the hammer-type brush holder by countersinking the interference-suppression inductor 5, 6, which provides further advantages over the conventional design.

All the wall parts both of the box-shaped brush receptacle 1 and of the connecting web 3, including the forks and the trough formed on the back of the holder, are designed not only to be relatively thin but also to have essentially equal wall thickness. This provides particular advantages for producing an integral plastic injection-molded part from a manufacturing engineering standpoint and results in a component having a desirably low mass inertia.

As already provided in the conventional design shown in FIGS. 11–13, plug-in lugs 1.5 and 2.3 are integrally formed on the integral plastic injection-molded part according to the inventive design as well. These lugs are illustrated, e.g., in FIGS. 3–5 and 8–10. The winding ends 5.1 and 5.2 of the inductor winding 5 can be pressed into the plug-in lugs 1.5 and 2.3, respectively, to provide a simple press-fitted means for retaining the interference-suppression conductor 5, 6. Spring elements (not shown) are suspended by one of their ends in suspension openings 3.7 of the connecting web 3. These spring elements are used to press the carbon brush 4 of the hammer-type brush holder against a wiped commutator or slipring (also not shown).

The above description of the preferred embodiments has been given by way of example. From the disclosure given, those skilled in the art will not only understand the present invention and its attendant advantages, but will also find apparent various changes and modifications to the structures disclosed. Thus, for instance, the connecting web 3 may be furcated into more than two forks at either the receptacle end or the bearing end. Further, it is not necessary that all forks on the receptacle end terminate at the longitudinal sidewalls of the receptacle. Thus, a third fork may be provided that extends centrally into the transverse sidewall 1.3 in addition to the forks 3.1 and 3.2. Similarly, one or more of the forks 3.1 or 3.2 could be further furcated into branches only some of which extend into the longitudinal sidewalls. Similar variations on the furcated arrangement may be provided on the bearing end as well. It is sought, therefore, to cover all such changes and modifications as fall within the spirit and scope of the invention, as defined by the appended claims, and equivalents thereof.

What is claimed is:

1. A plastic hammer-type brush holder for an electric machine, said holder formed as a pivoted arm, comprising:

a box-shaped brush receptacle provided on one end of the pivoted arm and having longitudinal sidewalls;

at least one pivoted bearing arrangement provided on the other end of the pivoted arm; and a thin-walled connecting web that connects said pivoted bearing arrangement and said box-shaped brush receptacle;

wherein said connecting web extends substantially parallel to the longitudinal walls; and wherein said connecting web is furcated into forks that lead, respectively, into the longitudinal sidewalls of said box-shaped brush receptacle.

2. The plastic hammer-type brush holder as claimed in claim 1, further comprising:

a further pivoted bearing arrangement provided on the other end of the pivoted arm;

wherein said pivoted bearing arrangement and said further pivoted bearing arrangement are laterally offset from one another at the other end of the pivoted arm and are arranged, respectively, on opposing sides of said connecting web, to form a two-point bearing; and wherein said connecting web is furcated into additional forks that lead, respectively, into said pivoted bearing arrangement and said further pivoted bearing arrangement.

3. The plastic hammer-type brush holder as claimed in claim 1, wherein said connecting web comprises:

a central rib;

a first pair of forks extending from a first end of said central rib into said box-shaped brush receptacle; and a second pair of forks extending from a second end of said central rib into said pivoted bearing arrangement.

4. The plastic hammer-type brush holder as claimed in claim 2, wherein said connecting web comprises:

a central rib;

a first pair of forks extending from a first end of said central rib into said box-shaped brush receptacle; and a second pair of forks extending from a second end of said central rib respectively into said pivoted bearing arrangement and said further pivoted bearing arrangement.

5. The plastic hammer-type brush holder as claimed in claim 1, further comprising:

a trough constructed on a top side of said connecting web, wherein said trough forms a receptacle for an interference-suppression inductor.

6. The plastic hammer-type brush holder as claimed in claim 5, wherein said trough extends into a longitudinal region of the pivoted arm in which said connecting web is furcated into the forks; and wherein said trough is recessed into an area between the forks.

7. The plastic hammer-type brush holder as claimed in claim 4, wherein said trough extends into a first region occupied by said first pair of forks;

wherein said trough additionally extends into a second region occupied by said second pair of forks; and wherein said trough is recessed into an area between the forks.

8. The plastic hammer-type brush holder as claimed in claim 1, wherein said box-shaped brush receptacle, said pivoted bearing arrangement, and said connecting web form part of an integrated plastic injection-molded piece.

9. The plastic hammer-type brush holder as claimed in claim 5, wherein said box-shaped brush receptacle, said pivoted bearing arrangement, said connecting web, and said trough form part of an integrated plastic injection-molded piece.

10. The plastic hammer-type brush holder as claimed in claim 1, wherein said box-shaped brush receptacle and said connecting web have approximately equal wall thicknesses.

11. The plastic hammer-type brush holder as claimed in claim 5, wherein said box-shaped brush receptacle, said connecting web and said trough have approximately equal wall thicknesses.

12. The plastic hammer-type brush holder as claimed in claim 8, wherein said box-shaped brush receptacle and said connecting web have approximately equal wall thicknesses.

13. The plastic hammer-type brush holder as claimed in claim 1, wherein said box-shaped brush receptacle comprises a brush box having the longitudinal sidewalls and transverse sidewalls, the brush box being open on an underside of the pivoted arm and forming a recess configured to secure a hammer-type brush through a press fit.

14. The plastic hammer-type brush holder as claimed in claim 1, further comprising fasteners provided at the one end of the pivoted arm and at the other end of the pivoted arm, for securing, through a snap-on connection, winding ends of an interference-suppression inductor to the hammer-type brush holder.

15. The plastic hammer-type brush holder as claimed in claim 9, further comprising fasteners formed integrally with the integrated plastic injection-molded piece, and provided at the one end of the pivoted arm and at the other end of the pivoted arm, for securing, through a snap-on connection, winding ends of an interference-suppression inductor to the hammer-type brush holder.

16. The plastic hammer-type brush holder as claimed in claim 1, wherein said connecting web comprises an insertion opening for receiving a brush press-on spring.

17. A brush holder for a commutator and brush assembly, said brush holder being made substantially of synthetic material, comprising:

a brush receptacle provided on a first end of said holder and having longitudinal sidewalls;

a bearing arrangement provided on a second end of said holder; and a connecting web extending between said bearing arrangement and said brush receptacle;

wherein said connecting web comprises:

a central portion; and a furcated portion comprising at least two forks extending from said central portion, respectively, at least substantially to the longitudinal sidewalls of said brush receptacle.

18. The brush holder as claimed in claim 17, wherein said connecting web further comprises:

a second furcated portion comprising at least two further forks extending from said central portion, respectively, at least substantially to opposing ends of said bearing arrangement.

19. The brush holder as claimed in claim 17, wherein said bearing arrangement comprises:

a first bearing; and a second bearing separated from said first bearing by a central spacing;

wherein said first bearing and said second bearing together form a two-point bearing; and wherein a second furcated portion comprises at least two further forks extending from said central portion, respectively, to said first bearing and to said second bearing.

20. The brush holder as claimed in claim 17, wherein said connecting web consists of two forks, each of said forks extending from said central portion exclusively into one of the longitudinal sidewalls of said brush receptacle, respectively.

* * * * *